(12) United States Patent
Lee

(10) Patent No.: US 10,287,449 B2
(45) Date of Patent: May 14, 2019

(54) HARD COATING FILM AND FLEXIBLE DISPLAY HAVING THE SAME

(71) Applicant: DONGWOO FINE-CHEM CO., LTD., Iksan-si, Jeollabuk-do (KR)

(72) Inventor: Seungwoo Lee, Hwaseong-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 15/597,240

(22) Filed: May 17, 2017

(65) Prior Publication Data

US 2017/0335131 A1 Nov. 23, 2017

(30) Foreign Application Priority Data

May 19, 2016 (KR) .................. 10-2016-0061269

(51) Int. Cl.
*C09D 135/02* (2006.01)
*G02B 1/14* (2015.01)

(52) U.S. Cl.
CPC ............. *C09D 135/02* (2013.01); *G02B 1/14* (2015.01)

(58) Field of Classification Search
CPC ....... C09D 133/14; C09D 135/02; G02B 1/14
See application file for complete search history.

(56) References Cited

U.S. PATENT DOCUMENTS

2015/0299505 A1* 10/2015 Kang .................. C08L 33/04
522/64
2017/0036242 A1* 2/2017 Lee .................. B05D 1/005

FOREIGN PATENT DOCUMENTS

KR 10-2014-0027023 A 3/2014

* cited by examiner

*Primary Examiner* — Edward J Cain
(74) *Attorney, Agent, or Firm* — Sughrue Mion, PLLC

(57) ABSTRACT

The present invention provides a single-layer substrate-less hard coating film, comprising a cross-linked polymer of an oligomer having an elongation of 50 to 350%, wherein the hard coating film has a cross-linked bending stiffness value ranging from 0.5 to 10 N·mm·%, and a flexible display having the hard coating film. The hard coating film according to the present invention has excellent impact resistance and curling properties and also has excellent bending resistance.

4 Claims, No Drawings

HARD COATING FILM AND FLEXIBLE DISPLAY HAVING THE SAME

CROSS REFERENCE TO RELATED APPLICATIONS

This application claims priority based on Korean Patent Application No. 10-2016-0061269, filed May 19, 2016, the content of which is incorporated herein by reference in its entirety.

TECHNICAL FIELD

The present invention relates to a hard coating film and a flexible display having the same. More particularly, the present invention relates to a hard coating film having excellent impact resistance and curling properties and also having excellent bending resistance, even without including a supporting substrate, and a flexible display having the hard coating film.

BACKGROUND ART

A hard coating film has been used for protecting the surface of various image displays including a liquid crystal display device (LCD), an electroluminescence (EL) display device, a plasma display (PD), a field emission display (FED) and the like.

Recently, a flexible display which can maintain display performance even when it is bent like a paper by using a flexible material such as plastic, instead of a conventional glass substrate having no flexibility, gains attention as a next generation display device. In this regard, there is a need for a hard coating film which not only has high hardness and good impact resistance but also has proper flexibility, without curling at the film edges during its production or use.

Korean Patent Application Publication No. 2014-0027023 discloses a hard coating film which comprises a supporting substrate; a first hard coating layer formed on one surface of the substrate and comprising a first photocurable cross-linked copolymer; and a second hard coating layer formed on the other surface of the substrate and comprising a second photocurable cross-linked copolymer and inorganic particles distributed in the second photocurable cross-linked copolymer, and the hard coating film exhibits high hardness, impact resistance, scratch resistance, and high transparency.

However, the hard coating film having excellent impact resistance and curling properties without including a supporting substrate has not yet been developed.

DISCLOSURE

Technical Problem

It is an object of the present invention to provide a hard coating film having excellent impact resistance and curling properties and also having excellent bending resistance, even without including a supporting substrate.

It is another object of the present invention to provide a flexible display having the hard coating film.

Technical Solution

In accordance with one aspect of the present invention, there is provided a single-layer substrate-less hard coating film, comprising a cross-linked polymer of an oligomer having an elongation of 50 to 350%, wherein the hard coating film has a cross-linked bending stiffness value ranging from 0.5 to 10 N·mm·%, which is defined by the following Equation 1.

Cross-linked Bending Stiffness=Bending Stiffness (N)×Coating Thickness (mm)×Crosslinking Density (%)    [Equation 1]

In one embodiment of the present invention, the hard coating film may be formed from a hard coating composition comprising an oligomer having an elongation of 50 to 350%, a photoinitiator and a solvent.

In one embodiment of the present invention, the oligomer having an elongation of 50 to 350% may include a urethane acrylate oligomer.

In one embodiment of the present invention, the oligomer having an elongation of 50 to 350% may include a bifunctional urethane acrylate oligomer.

In accordance with another aspect of the present invention, there is provided a flexible display having the hard coating film.

Advantageous Effects

Even though the hard coating film according to the present invention is a single-layer film not including a supporting substrate, it is excellent in impact resistance and curling properties and also has excellent bending resistance, and thus it can be effectively used for a flexible display.

BEST MODE

Hereinafter, the present invention will be described in more detail.

One embodiment of the present invention relates to a single-layer substrate-less hard coating film, comprising a cross-linked polymer of an oligomer having an elongation of 50 to 350%, wherein the hard coating film has a cross-linked bending stiffness value ranging from 0.5 to 10 N·mm·%, which is defined by the following Equation 1:

Cross-linked Bending Stiffness=Bending Stiffness (N)×Coating Thickness (mm)×Crosslinking Density (%)    [Equation 1]

The cross-linked bending stiffness is a value determined by the bending stiffness of the hard coating film, which is the maximum strength generated from the hard coating film when the hard coating film is bent at a constant speed, the crosslinking density of the hard coating film showing how closely the polymer network of the hard coating film is interconnected, and the thickness of the hard coating film after curing. The method for measuring the thickness, the crosslinking density and the bending stiffness of the hard coating film is not particularly limited, and the measurement can be performed by any method known in the art. For example, the bending stiffness can be determined by placing a hard coating film at two points apart from each other by a certain distance, and pressing the film by applying a load in a vertical direction in which the film is placed at a constant speed until breakage of the film occurs, to measure a stress and a strain. The crosslinking density can be measured by Flory-Rehner method which calculates the crosslinking density by swelling, or Mooney-Rivlin method which calculates the crosslinking density from the stress-strain measurement, or the like.

For example, the bending stiffness and the crosslinking density can be measured by the method presented in the experimental examples described later. When the value of the cross-linked bending stiffness is less than 0.5 N·mm·%, it is difficult to obtain sufficient impact resistance of the hard coating film, and when the value exceeds 10 N·mm·%, the impact resistance and bending resistance of the hard coating film may be lowered.

The hard coating film according to one embodiment of the present invention includes a cross-linked polymer of an oligomer having an elongation of 50 to 350%, and by adjusting the range of cross-linked bending stiffness value to 0.5 to 10 N·mm·%, the hard coating film has excellent impact resistance and curling properties and also is excellent in bending resistance, even though it is a single-layer film not including a supporting substrate.

In one embodiment of the present invention, the term "substrate" of "substrate-less" means a supporting substrate that becomes a supporting means for applying a hard coating composition for forming the hard coating layer, and remains in a state that is not peeled off even after the hard coating composition is cured. Therefore, the term "substrate-less" means that the hard coating film does not include such supporting substrate.

The hard coating film of the present invention, unlike a conventional hard coating film, is a substrate-less film. That is, the hard coating film does not contain a supporting substrate such as a plastic resin film, which serves to support the hard coating layer and is not peeled off even after curing.

The hard coating film according to one embodiment of the present invention is a single-layer substrate-less film composed of one hard coating layer. However, it does not exclude possibility to attach another membrane, layer or film onto the hard coating film.

The hard coating film of the present invention exhibits high impact resistance while having excellent curling properties, even without including a supporting substrate.

The hard coating film according to one embodiment of the present invention can be formed by curing a hard coating composition comprising an oligomer having an elongation of 50 to 350%, a photoinitiator, and a solvent.

The oligomer having an elongation of 50 to 350% may include a urethane acrylate oligomer.

As the urethane acrylate oligomer, any oligomer being used in the art can be used without limitation as long as the elongation is 50 to 350%, and preferably, those prepared by subjecting an isocyanate compound having two or more isocyanate groups in the molecule and an acrylate compound having one or more hydroxy groups in the molecule to urethane reaction can be used.

Specific examples of the isocyanate compound may include tri-functional isocyanates derived from 4,4'-dicyclohexyl diisocyanate, hexamethylene diisocyanate, 1,4-diisocyanatobutane, 1,6-diisocyanatohexane, 1,8-diisocyanatooctane, 1,12-diisocyanatododecane, 1,5-diisocyanato-2-methylpentane, trimethyl-1,6-diisocyanatohexane, 1,3-bis(isocyanatomethyl)cyclohexane, trans-1,4-cyclohexene diisocyanate, 4,4'-methylenebis(cyclohexyl isocyanate), isophorone diisocyanate, toluene-2,4-diisocyanate, toluene-2,6-diisocyanate, xylene-1,4-diisocyanate, tetramethylxylene-1,3-diisocyanate, 1-chloromethyl-2,4-diisocyanate, 4,4'-methylenebis (2,6-dimethylphenyl isocyanate), 4,4'-oxybis(phenylisocyanate), hexamethylene diisocyanate, and an adduct of trimethyl propanol and toluene diisocyanate, and these may be used alone or in combination of two or more.

Specific examples of the acrylate compound having a hydroxyl group may include 2-hydroxyethyl acrylate, 2-hydroxyisopropyl acrylate, 4-hydroxybutyl acrylate, caprolactone ring-opening hydroxyacrylate, a mixture of pentaerythritol tri/tetraacrylate, a mixture of dipentaerythritol penta/hexaacrylate, and these may be used alone or in combination of two or more.

The urethane acrylate oligomer may be, for example, a bifunctional urethane acrylate oligomer. As the bifunctional urethane acrylate oligomer, for example, CN9002, CN910A70, CN9167, CN9170A86, CN9200, CN963B80, CN964A85, CN965, CN966H90, CN9761, CN9761A75, CN981, CN991 and CN996 (commercially available from Sartomer Arkema), UF8001G and DAUA-167 (commercially available from KYOEISA Chemical) can be used.

The urethane acrylate oligomer can be polymerized during curing of the hard coating composition to form a cross-linked polymer.

The oligomer having an elongation of 50 to 350% may be contained in an amount of 1 to 90% by weight, preferably 5 to 85% by weight based on 100% by weight of the entire hard coating composition. When the amount of the oligomer is less than 1% by weight, sufficient impact resistance cannot be obtained. When the amount of the oligomer is higher than 90% by weight, it may be difficult to form a uniform cured coating film due to its high viscosity.

The photoinitiator is used for photocuring of the hard coating composition, and can be used without particular limitation as long as it is an initiator being used in the art. The photoinitiator can be classified into a Type I photoinitiator in which radicals are generated by decomposition of molecules due to a difference in chemical structure or molecular binding energy, and a Type II (hydrogen abstraction type) photoinitiator in which tertiary amines are incorporated as a co-initiator. Specific examples of the Type I photoinitiator may include acetophenones such as 4-phenoxydichloroacetophenone, 4-t-butyldichloroacetophenone, 4-t-butyltrichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl)ketone, 1-hydroxycyclohexyl phenyl ketone or the like, benzoins such as benzoin, benzoin methyl ether, benzoin ethyl ether, benzyl dimethyl ketal or the like, acylphosphine oxides, and titanocene compounds. Specific examples of the Type 11 photoinitiator may include benzophenones such as benzophenone, benzoyl benzoic acid, benzoyl benzoic acid methyl ether, 4-phenylbenzophenone, hydroxybenzophenone, 4-benzoyl-4'-methyldiphenylsulfide, 3,3'-methyl-4-methoxybenzophenone or the like, and thioxanthones such as thioxanthone, 2-chlorothioxanthone, 2-methylthioxanthone, 2,4-dimethylthioxanthone, isopropylthioxanthone or the like. These photoinitiators may be used alone or in combination of two or more. In addition, Type I and Type II can be used together.

The photoinitiator may be used in an amount sufficient to proceed photopolymerization and may be used in an amount of 0.1 to 5% by weight, for example, 1 to 3% by weight based on 100% by weight of the entire hard coating composition. If the amount of the photoinitiator is less than 0.1% by weight, the curing does not proceed sufficiently and thus it is difficult to realize the mechanical properties and adhesive force of the finally obtained hard coating film. If the amount of the photoinitiator is higher than 5% by weight, the curing may excessively occur to generate cracks in the hard coating film.

The solvent may be used without particular limitation as long as it is a solvent being commonly used in the art. Specific examples of the solvent may include alcohols (methanol, ethanol, isopropanol, butanol, etc.), cellosolves (methyl cellosolve, ethyl cellosolve, etc.), ketones (methyl ethyl ketone, methyl butyl ketone, methyl isobutyl ketone, diethyl ketone, dipropyl ketone, cyclohexanone, etc.), hexanes (hexane, heptane, octane, etc.), benzenes (benzene, toluene, xylene, etc.). These solvents may be used alone or in a combination of two or more.

The solvent may be contained in an amount of 5 to 90% by weight, preferably 10 to 85% by weight, based on 100% by weight of the hard coating composition. If the amount of the solvent is less than 5% by weight, the viscosity may increase to deteriorate workability. If the amount of the solvent is higher than 90% by weight, it is difficult to adjust the thickness of the coating film, and drying unevenness occurs, resulting in appearance defects.

In addition, the hard coating composition may include a leveling agent in order to provide the smoothness and coating property of a coating film during coating of the composition.

As the leveling agent, silicon-type, fluorine-type and acrylic polymer-type leveling agents being commercially available may be selected and used. For example, BYK-323, BYK-331, BYK-333, BYK-337, BYK-373, BYK-375, BYK-377, BYK-378 (BYK Chemie), TEGO Glide 410, TEGO Glide 411, TEGO Glide 415, TEGO Glide 420, TEGO Glide 432, TEGO Glide 435, TEGO Glide 440, TEGO Glide 450, TEGO Glide 455, TEGO Rad 2100, TEGO Rad 2200N, TEGO Rad 2250, TEGO Rad 2300, TEGO Rad 2500 (Degussa), FC-4430 and FC-4432 (3M), or the like may be used. The leveling agent may be contained in an amount of 0.1 to 1% by weight based on 100% by weight of the hard coating composition.

In addition to the above-mentioned components, the hard coating composition may further include components commonly used in the art, such as a ultraviolet stabilizer, a heat stabilizer, an antioxidant, a surfactant, a lubricant, an anti-fouling agent and the like.

The hard coating film according to one embodiment of the present invention can be formed by coating the hard coating composition onto a release film followed by curing for convenience of the transportation, storage, processing or use. Any release film which is commonly used in the technical field to which the present invention belongs can be used without limitation. According to one embodiment of the present invention, the release film may be a polyester film, a polyethylene film, a polyethylene terephthalate film, a polypropylene film, a cycloolefin polymer film, or a Teflon film, and preferably, it can be a silicone or acrylic silicone release-treated film for facilitating peeling.

The release film may be peeled off and eliminated after the hard coating composition is cured. Or, it may be peeled off immediately before use, and may not be eliminated even after curing so that it is advantageous for transportation and storage.

The hard coating composition may be coated onto the release film by suitably using a known coating process such as die coater, air knife, reverse roll, spray, blade, casting, gravure, micro gravure, spin coating, etc.

After the hard coating composition is coated onto the release film, a drying process may be carried out by vaporizing volatiles at a temperature of 30 to 150° C. for 10 seconds to one hour, more specifically 30 seconds to 30 minutes, followed by UV curing. The UV curing may be carried out by the irradiation of UV-rays at about 0.01 to 10 J/cm², particularly 0.1 to 2 J/cm².

After the hard coating composition is completely cured, the release film may be peeled off to obtain a hard coating film formed as a single-layer without a supporting substrate.

One embodiment of the present invention may further include one or more layers selected from the group consisting of a plastic resin film, an adhesive film, a release film, a conductive film, a conductive layer, a non-conductive film, a metal mesh layer or a patterned metal layer, which are attached to one surface of the hard coating film, but are not limited thereto.

One embodiment of the present invention relates to a flexible display having the above-described hard coating film. For example, the hard coating film of the present invention may be used as a window of the flexible display. Further, the hard coating film of the present invention may be used by attaching to a polarizing plate, a touch sensor, or the like.

The hard coating film according to one embodiment of the present invention may be used in liquid crystal devices (LCDs) of various operation modes, including reflective, transmissive, transflective, twisted nematic (TN), super-twisted nematic (STN), optically compensated bend (OCB), hybrid-aligned nematic (HAN), vertical alignment (VA)-type and in-plane switching (IPS) LCDs. Also, the hard coating film according to one embodiment of the present invention may be used in various image display devices, including plasma displays, field emission displays, organic EL displays, inorganic EL displays, electronic paper and the like.

Hereinafter, the present invention will be described in more detail with reference to examples, comparative examples and experimental examples. It should be apparent to those skilled in the art that these examples, comparative examples and experimental examples are for illustrative purposes only, and the scope of the present invention is not limited thereto.

Preparation Example 1: Preparation of Hard Coating Composition A-1

60 wt % of a urethane acrylate oligomer (elongation: 70%. UF-8001G from KYOEISA Chemical), 37 wt % of methyl ethyl ketone, 2.5 wt % of a photoinitiator (1-hydroxycyclohexyl phenyl ketone), and 0.5 wt % of a leveling agent (BYK-3570 from BYK Chemie) were mixed using a stirrer and then filtered with a polypropylene (PP) filter to prepare a hard coating composition.

Preparation Example 2: Preparation of Hard Coating Composition A-2

60 wt % of a urethane acrylate oligomer (elongation: 135%. NK UA-232P from Shin-Nakamura Chemical), 37 wt % of methyl ethyl ketone, 2.5 wt % of a photoinitiator (1-hydroxycyclohexyl phenyl ketone), and 0.5 wt % of a leveling agent (BYK-310 from BYK Chemie) were mixed using a stirrer and then filtered with a polypropylene (PP) filter to prepare a hard coating composition.

Comparative Preparation Example 1: Preparation of Hard Coating Composition A-3

60 wt % of a urethane acrylate oligomer (elongation: 1000%, CN9021NS from Sartomer), 37 wt % of methyl ethyl ketone, 2.5 wt % of a photoinitiator (1-hydroxycyclohexyl phenyl ketone), and 0.5 wt % of a leveling agent (BYK-310 from BYK Chemie) were mixed using a stirrer and then filtered with a polypropylene (PP) filter to prepare a hard coating composition.

Examples 1 to 4 and Comparative Examples 1 to 4:
Preparation of Hard Coating Film Example 1

After the hard coating composition prepared in Preparation Example 1 was coated onto one surface of a COP film in a thickness of 100 μm, the solvent was dried and the composition was cured by irradiating with an integrated amount (1.5 J/cm$^2$) of ultraviolet ray to produce a hard coating film. Then, the COP film was peeled off and eliminated, and then the bending stiffness and crosslinking density of the produced hard coating film were measured by the following method. The bending stiffness of the film was 0.5 N, the crosslinking density was 60%, and the cross-linked bending stiffness was 3 N·mm-0%.

(1) Measurement of Bending Stiffness

The bending stiffness was determined by using a universal testing machine (UTM) and measuring the force shown when the hard coating film was bent at a speed of 100 mm/min in the direction of the coated surface of the film until the distance between the folded film was 6 mm.

(2) Measurement of Crosslinking Density

The hard coating film was stored in a 15 ml tetrahydrofuran (THF) solution at room temperature for 24 hours and filtered. Then, the undissolved portion was dried at 100° C. for 3 hours and then dried again at 50° C. for 15 hours. At this time, the weight of the hard coating film before being immersed in the THF solution ($W_0$) and the weight of the hard coating film after being immersed in the THF solution ($W_t$) were measured, and the crosslinking density was calculated according to the following formula.

$$\text{Crosslinking density (\%)} = W_t/W_0 \times 100$$

Example 2

After the hard coating composition prepared in Preparation Example 1 was coated onto one surface of a COP film in a thickness of 120 μm, the solvent was dried and the composition was cured by irradiating with an integrated amount (1.5 J/cm$^2$) of ultraviolet ray to produce a hard coating film. Then, the COP film was peeled off and eliminated, and then the bending stiffness and crosslinking density of the produced hard coating film were measured in the same manner as in Example 1. The bending stiffness of the film was 0.7 N, the crosslinking density was 55%, and the cross-linked bending stiffness was 4.62 N·mm·%.

Example 3

After the hard coating composition prepared in Preparation Example 1 was coated onto one surface of a COP film in a thickness of 130 μm, the solvent was dried and the composition was cured by irradiating with an integrated amount (1.5 J/cm$^2$) of ultraviolet ray to produce a hard coating film. Then, the COP film was peeled off and eliminated, and then the bending stiffness and crosslinking density of the produced hard coating film were measured in the same manner as in Example 1. The bending stiffness of the film was 0.8 N, the crosslinking density was 50%, and the cross-linked bending stiffness was 5.2 N·mm·%.

Example 4

After the hard coating composition prepared in Preparation Example 2 was coated onto one surface of a COP film in a thickness of 100 μm, the solvent was dried and the composition was cured by irradiating with an integrated amount (1.0 J/cm$^2$) of ultraviolet ray to produce a hard coating film. Then, the COP film was peeled off and eliminated, and then the bending stiffness and crosslinking density of the produced hard coating film were measured in the same manner as in Example 1. The bending stiffness of the film was 0.5 N, the crosslinking density was 50%, and the cross-linked bending stiffness was 2.5 N·mm·%.

Comparative Example 1

After the hard coating composition prepared in Preparation Example 1 was coated onto one surface of a COP film in a thickness of 150 μm, the solvent was dried and the composition was cured by irradiating with an integrated amount (3.0 J/cm$^2$) of ultraviolet ray to produce a hard coating film. Then, the COP film was peeled off and eliminated, and then the bending stiffness and crosslinking density of the produced hard coating film were measured m the same manner as in Example 1. The bending stiffness of the film was 1.2 N, the crosslinking density was 80%, and the cross-linked bending stiffness was 14.4 N·mm·%.

Comparative Example 2

After the hard coating composition prepared in Preparation Example 1 was coated onto one surface of a COP film in a thickness of 50 μm, the solvent was then dried and the composition was cured by irradiating with an integrated amount (0.2 J/cm$^2$) of ultraviolet ray for curing the composition to produce a hard coating film. Then, the COP film was peeled off and eliminated, and then the bending stiffness and crosslinking density of the produced hard coating film were measured in the same manner as in Example 1. The bending stiffness of the film was 0.2 N, the crosslinking density was 40%, and the cross-linked bending stiffness was 0.4 N·mm·%.

Comparative Example 3

After the hard coating composition prepared in Comparative Preparation Example 1 was coated onto one surface of a COP film in a thickness of 100 μm, the solvent was dried and the composition was cured by irradiating with an integrated amount (1.0 J/cm$^2$) of ultraviolet ray to produce a hard coating film. Then, the COP film was peeled off and eliminated, and then the bending stiffness and crosslinking density of the produced hard coating film were measured in the same manner as in Example 1. The bending stiffness of the film was 0.7 N, the crosslinking density was 60%, and the cross-linked bending stiffness was 4.2 N·mm·%.

Comparative Example 4

After the hard coating composition prepared in Comparative Preparation Example 1 was coated onto one surface of a COP film in a thickness of 150 μm, the solvent was then dried and the composition was cured by irradiating with an integrated amount (3.0 J/cm$^2$) of ultraviolet ray to produce a hard coating film. Then, the COP film was peeled off and eliminated, and then the bending stiffness and crosslinking density of the produced hard coating film were measured in the same manner as in Example 1. The bending stiffness of the film was 1.5 N, the crosslinking density was 60%, and the cross-linked bending stiffness was 13.5 N·mm·%.

Experimental Example 1: Evaluation of Bending Resistance at Room Temperature

Each of the hard coating films of Examples and Comparative Examples was folded in half so that the distance between the film surface was 6 mm. Next, when the film was spread again, it was confirmed with the naked eye whether or not cracks occurred in the folded portion, and thereby the bending resistance at room temperature was evaluated. The results are shown in Table 1 below.

<Evaluation Criteria>

Good: No occurrence of cracks in the folded portion

Poor: Occurrence of cracks in the folded portion

Experimental Example 2: Evaluation of Bending Resistance at High Temperature-High Humidity Each of the hard coating films of Examples and Comparative Examples was folded in half so that the distance between the film surface was 6 mm, and then the film was treated for 24 hours at 85° C. and 85% relative humidity. Next, after the film was spread again, it was confirmed with the naked eye whether or not cracks occurred in the folded portion, and thereby the bending resistance at high temperature-high humidity was evaluated. The results are shown in Table 1 below.

<Evaluation Criteria>

Good: No occurrence of cracks in the folded portion

Poor: Occurrence of cracks in the folded portion

Experimental Example 3: Evaluation of Impact Resistance

After bonding a glass with 50 μm OCA (elastic modulus: 0.08 Mpa) on one surface of each of the hard coating films of Examples and Comparative Examples, the weight of the maximum steel ball in which the glass at the lower part of the film was not destroyed when a steel ball was dropped thereon from a height of 50 cm was measured. The results are shown in Table 1 below.

Experimental Example 4: Evaluation of Curl Generation

Each of the hard coating films of Examples and Comparative Examples was cut to a size of 10 cm-10 cm, and then allowed to stand at 25° C. and 48 RH % for 24 hours, and the degree at which each edge of the hard coating film was lifted from the bottom was evaluated. The results are shown in Table 1 below.

<Evaluation Criteria>

◎: Average height of four edges was 20 mm or less

○: Average height of four edges was 50 mm or less

Δ: Average height of four edges was higher than 50 mm

X: Four edges were completely lifted, and the film was curled in a cylindrical shape

TABLE 1

| | Bending resistance at room temperature | Bending resistance at high temperature-high humidity | Impact resistance | Curl |
|---|---|---|---|---|
| Example 1 | Good | Good | 55 g | ◎ |
| Example 2 | Good | Good | 60 g | ◎ |
| Example 3 | Good | Good | 66 g | ◎ |
| Example 4 | Good | Good | 60 g | ◎ |
| Comparative Example 1 | Poor | Poor | 22 g | Δ |
| Comparative Example 2 | Poor | Poor | 15 g | Δ |
| Comparative Example 3 | Poor | Poor | 18 g | Δ |
| Comparative Example 4 | Poor | Poor | 15 g | Δ |

As can be seen from Table 1, the hard coating films of Examples comprising a cross-linked polymer of an oligomer having an elongation of 50 to 350%, wherein the hard coating film has a cross-linked bending stiffness value of 0.5 to 10 N·mm·%, exhibited excellent impact resistance, curling properties and bending resistance, even without including a supporting substrate, whereas the hard coating films of Comparative Examples in which the elongation of the oligomer or the cross-linked bending stiffness of the hard coating film does not satisfy the above range were poor in the bending resistance, impact resistance, or curling properties.

Although particular embodiments of the present invention have been shown and described in detail, it will be obvious to those skilled in the art that these specific techniques are merely preferred embodiments, and various changes and modifications may be made to the invention without departing from the spirit and scope of the invention.

The substantial scope of the present invention, therefore, is to be defined by the appended claims and equivalents thereof.

The invention claimed is:

1. A single-layer substrate-less hard coating film, comprising a cross-linked polymer of an oligomer having an elongation of 50 to 350%, wherein the hard coating film has a cross-linked bending stiffness value ranging from 0.5 to 10 N·mm·%, which is defined by the following Equation 1:

Cross-linked Bending Stiffness=Bending Stiffness (N)×Coating Thickness (mm)×Crosslinking Density (%)   Equation 1.

2. The hard coating film of claim 1, wherein the hard coating film is formed from a hard coating composition comprising an oligomer having an elongation of 50 to 350%, a photoinitiator and a solvent.

3. The hard coating film of claim 2, wherein the oligomer having an elongation of 50 to 350% includes a urethane acrylate oligomer.

4. The hard coating film of claim 3, wherein the urethane acrylate oligomer includes a bifunctional urethane acrylate oligomer.

* * * * *